United States Patent
Dutta et al.

(10) Patent No.: US 7,747,597 B2
(45) Date of Patent: Jun. 29, 2010

(54) SECURITY EXECUTION CONTEXT FOR A DATABASE MANAGEMENT SYSTEM

(75) Inventors: Tanmoy Dutta, Sammamish, WA (US); Raul Garcia, Kirkland, WA (US); Ziquan Li, Redmond, WA (US); Girish Chander, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 522 days.

(21) Appl. No.: 11/170,585

(22) Filed: Jun. 29, 2005

(65) Prior Publication Data

US 2007/0005600 A1    Jan. 4, 2007

(51) Int. Cl.
 *G06F 7/00* (2006.01)
(52) U.S. Cl. ............. 707/705; 707/769; 707/783; 726/27
(58) Field of Classification Search ............. None
See application file for complete search history.

(56) References Cited

U.S. PATENT DOCUMENTS

| | | | |
|---|---|---|---|
| 5,619,657 A | | 4/1997 | Sudama et al. |
| 5,708,812 A | * | 1/1998 | Van Dyke et al. ............ 717/171 |
| 5,941,947 A | * | 8/1999 | Brown et al. ............ 709/225 |
| 5,956,715 A | * | 9/1999 | Glasser et al. ............ 1/1 |
| 6,085,191 A | * | 7/2000 | Fisher et al. ............ 707/10 |
| 6,289,344 B1 | * | 9/2001 | Braia et al. ............ 707/9 |
| 6,332,163 B1 | * | 12/2001 | Bowman-Amuah ......... 709/231 |
| 6,412,070 B1 | * | 6/2002 | Van Dyke et al. ............ 726/17 |
| 6,457,007 B1 | * | 9/2002 | Kikuchi et al. ............ 707/10 |
| 6,487,552 B1 | * | 11/2002 | Lei et al. ............ 1/1 |
| 6,604,198 B1 | * | 8/2003 | Beckman et al. ............ 713/167 |
| 6,754,658 B1 | * | 6/2004 | Matsuno ............ 1/1 |
| 7,013,296 B1 | * | 3/2006 | Yemini et al. ............ 705/77 |
| 7,127,462 B2 | | 10/2006 | Hiraga et al. |
| 7,149,738 B2 | * | 12/2006 | Kumar et al. ............ 1/1 |
| 2002/0116385 A1 | * | 8/2002 | Kagalwala et al. ............ 707/100 |
| 2003/0014394 A1 | * | 1/2003 | Fujiwara et al. ............ 707/3 |
| 2003/0023880 A1 | * | 1/2003 | Edwards et al. ............ 713/201 |
| 2004/0123108 A1 | | 6/2004 | Winkler et al. |
| 2004/0128392 A1 | * | 7/2004 | Blakley et al. ............ 709/229 |
| 2004/0230831 A1 | * | 11/2004 | Spelman et al. ............ 713/201 |
| 2005/0192921 A1 | * | 9/2005 | Chaudhuri et al. ............ 707/1 |
| 2005/0283460 A1 | | 12/2005 | Chen |
| 2006/0288214 A1 | | 12/2006 | Dutta |
| 2007/0162752 A1 | | 7/2007 | Baliga et al. |
| 2008/0022382 A1 | | 1/2008 | Bradbury |
| 2009/0024566 A1 | | 1/2009 | Wong |

OTHER PUBLICATIONS

Oracle Database 10g Release 2 (10.2) Documentation, 2005, 1 page, Oracle Technology Network.

(Continued)

*Primary Examiner*—Tim T. Vo
*Assistant Examiner*—Hasanul Mobin
(74) *Attorney, Agent, or Firm*—Workman Nydegger

(57) ABSTRACT

A database management system that supports multiple databases in an instance with controlled sharing between the databases. The invention can also support execution of procedures and other modules in the context of any principal possibly different from that of the caller. Trusted certificates can be employed to permit access to procedures (or other modules). The security context of the invention can enable the building blocks of building a pure trusted sub-system model of authorization.

18 Claims, 12 Drawing Sheets

OTHER PUBLICATIONS

Relational Database Servers, Software & Data Management, 3 pages, Sybase Adaptive Server Enterprise.
MySQL Documentation, 4 pages.
OA dated Feb. 10, 2009 for U.S. Appl. No. 11/156,149, 26 pages.
Office Action dated Jul. 23, 2009 cited in U.S. Appl. No. 11/156,149.
Notice of Allowance dated Jan. 15, 2010 cited in U.S. Appl. No. 11/156,149.

* cited by examiner

SECURITY EXECUTION CONTEXT FOR A DATABASE MANAGEMENT SYSTEM

BACKGROUND

With the increasing popularity of computing devices, more and more data gets stored in relational databases. Information stored in databases routinely gets accessed via the Internet. Today, users access data stored in databases via personal computers (PCs), handheld computers, smart phones and the like. Accordingly, many companies provide for services whereby a vendor can upload database information thus allowing authorized customers and clients to access resources from those databases.

Both commercial (e.g., Oracle-brand, Sybase-brand, DB2-brand) and non-commercial (e.g., Exodus-brand, Postgres-brand) database management systems (DBMSs) are being used to provide for access to such resources. Unfortunately, mechanisms are not provided that isolate and control sharing between resources in these disparate databases within the same server, under security execution contexts different from that of the caller.

As more and more information gets stored in DBMSs, applications built over these DBMSs begin to function as trusted sub-systems. A trusted sub-system based security model differs from an access-control-against-the-end-user based security model in that in the former, security checks are performed at the point-of-entry. After the security check is successful, the trusted subsystem elevates to a privileged context and accesses data in that context.

Traditionally, DBMS products, which act as a platform for data-centric applications, support an access control based model. Unfortunately, this model falls short of its ability to perform complex operations as illustrated in the SAP-brand, BaaN-brand and PeopleSoft-brand of products. Consequently, those applications frequently implement a trusted sub-system based model completely separate from the database system. In other words, conventionally, these trusted sub-system based models are implemented in a disparate process. This separation causes the transport between the database system and the application process to be very secretive and often results in an abuse of the security capabilities of the DBMS.

Conventional systems do not provide a specification and implementation of a security execution context within a DBMS that autonomously supports capabilities to build trusted sub-system based applications. Accordingly, these traditional systems do not provide an implementation of a security authorization model that independently allows for these isolation and controlled share features to simultaneously ensure that the newly impersonated context is sandboxed to the correct privilege levels.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention disclosed and claimed herein, in one aspect thereof, comprises a database management system (DBMS) that supports multiple databases in an instance with controlled sharing between the databases. Each database acts as an independent domain of administration duly administered by the owner of the database or one of its delegates. The invention can also support execution of procedures and other modules in the context of any principal possibly different from that of the caller. The security context of the invention can enable the building blocks of a pure trusted sub-system model of authorization.

In another aspect of the subject invention, to achieve flexibility in the execution context, the DBMS can maintain a stack of execution contexts. Accordingly, when an "execute as" statement is executed, a new frame denoting the new security context can be pushed into the stack. When a "revert" statement is encountered, the top most frame can be popped.

Yet another aspect is directed to annotating stored procedures and other modules. For stored procedures and other modules that are annotated with the "execute as" clause a similar activity is performed. In this aspect, the pushed frame will be popped when the module execution terminates. Accordingly, the invention can enable scenarios, whereby, the owner of a procedure can execute the procedure at a higher security level than that of the person invoking the stored procedure. As well, the owner can control who can execute the procedure via the normal execute permission on the procedure. In essence, it will be appreciated that such a procedure can form the basis of a trusted sub-system. It should be understood that, since the procedure executes with the context that the owner of the procedure annotates, accesses to resources made inside the procedure may not need to be checked against the caller of the procedure.

As a consequence of the availability of this scheme above, the owner of the procedure can prohibit the caller from directly accessing or performing operations on the resources outside of the stored procedure. Therefore, the caller can be constrained to the operation of the stored procedure and hence be subject to the potential business logic that the code in the stored procedure enforces.

In still another aspect, once a new security context is established on entry to a procedure, any other procedure or module that the original procedure calls will be executed under the newly impersonated context. Again, this security context can enhance security features of DBMSs.

In other aspects, disparate trusted sub-systems can be layered using nested procedure sets resulting in the ability to build arbitrarily complex nested applications. As a result, a malicious administrator of a database may be able to figure out from out-of-band sources of information (e.g., social circles) about the existence of a privileged user in another database. The malicious administrator may be able to create a procedure in his own database to execute as that individual and hence be able to perform actions or retrieve data from the target database that the malicious administrator is otherwise not authorized to. In order to mitigate this problem, the subject invention can keep a note of a specially privileged principal (called for example "authenticator"). This principal vouches for the security context that is established in the target database. The owner of the target database has the freedom to discern which set of principals is thus privileged.

In the aspect, when the security context navigates to a domain (e.g., database), the security context can be mapped to an identity provisioned in the database. Prior to the system performing that mapping, the credentials of the "authenticator" can be verified to determine whether the "authenticator" is trusted to vouch for the mapping in that database. It is to be understood that the owner of the target database can establish such a trust by bestowing upon an "authenticator" principal the special permission called "authenticate."

In still another aspect, the DBMS supports a notion of digitally signing a procedure and/or other module (e.g., a table valued function or an assembly). This signature or more appropriately the certificate or asymmetric key that is used to sign the module can serve as the authenticator. The owner of the target domain (e.g., database) can now bestow this authenticator a trust by granting it the special permission (e.g., authenticate).

In another aspect, the invention is directed to a system and methodology that can identify an authenticator of a security context. First, the target database can define the principals that are trusted to serve as authenticators. That is, principals that are trusted to vouch for the identity of a security context in that database can be defined. Secondly, the implementation of the database system can tag this principal's (e.g., the authenticator's) identity along with every security context that is established. In this aspect, if the principal (e.g., authenticator) is not permitted to establish the security context in the target database the call will fail. In other words, if the authenticator is not trusted in the target database, the call will fail.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
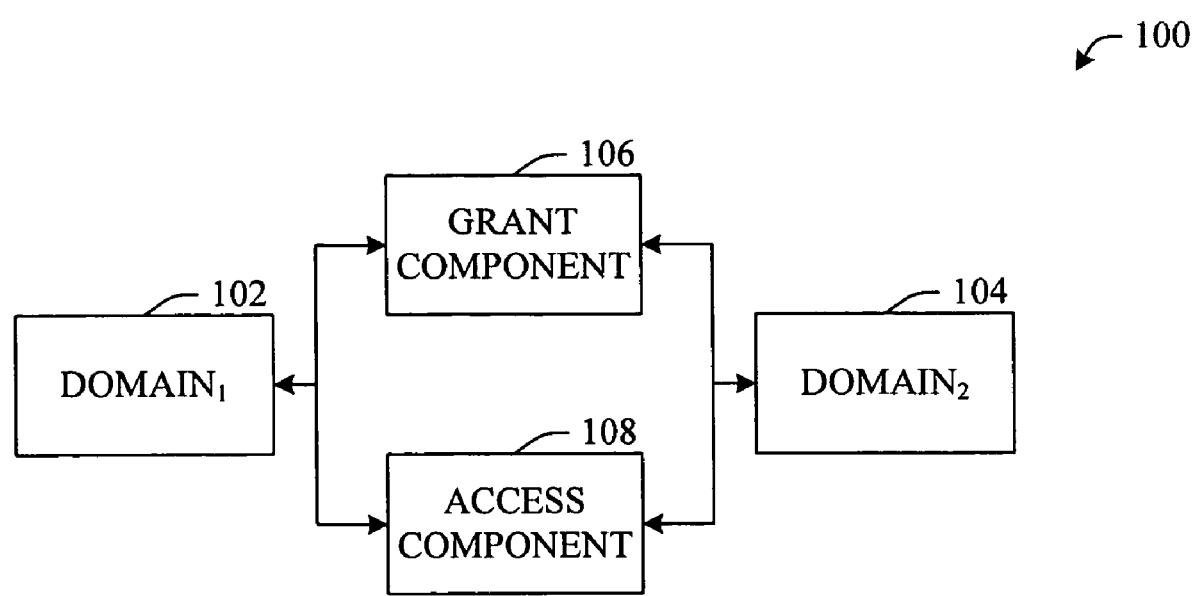
FIG. 1 illustrates a general component block diagram of a system that grants access between disparate domains in accordance with an aspect of the subject invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to FIG. 1, a system 100 is shown. Generally, system 100 can include a first domain (DOMAIN$_1$ 102) and a second domain (DOMAIN$_2$ 104) whereby the first domain 102 can establish an instance-level security context with the second domain 104. Although the system 100 illustrated in FIG. 1 employs two disparate domains, it is to be appreciated that the novel functionality described herein can be applied to any number of disparate domains without departing from the spirit and scope of the invention and claims appended hereto.

The subject invention can support multiple independent domains 102, 104 (e.g., databases) in an instance with controlled sharing between the domains 102, 104 (e.g., databases). It is to be understood that the described scheme is employable in a two (or more) level administrative domain setting. In other words, there can be a level administered by a system administrator. Within that domain, there can be independent sub-domains independently administered by the owners of the disparate sub-domains.

Further, the invention can support execution of procedures (e.g., stored procedures) and other modules in the context of any principal possibly different from that of the caller— thereby enabling the building blocks of a pure trusted subsystem model of authorization. Aspects of the invention will be better understood following a review of the description and figures that follow.

Continuing with the example of FIG. 1, a grant component 106 can be employed to grant an instance-level security context, access to the second domain 104. An access component 108 can be employed to effect access from the first domain 102 to the second domain 104 in accordance with the grant component 106. It should be appreciated and understood that either or both of the grant component 106 and the access component 108 can be integral to one or both of the first and second domains (102, 104). As well, the components (106, 108) illustrated in FIG. 1 can be combined into a single component or isolated from the domains (102, 104) altogether.

Figure 2:
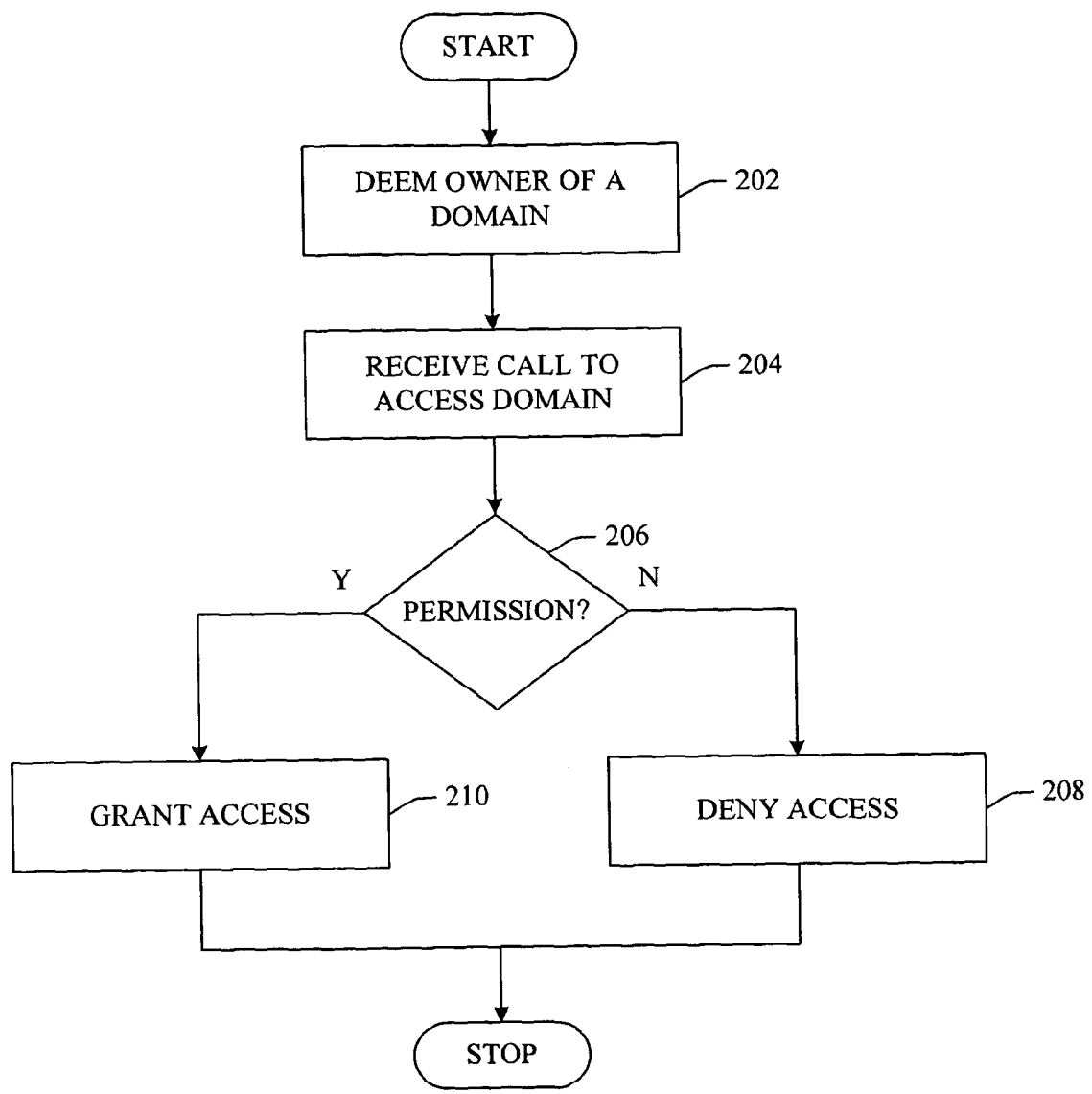
FIG. 2 illustrates an exemplary flow chart of procedures to establish access to a domain in accordance with a disclosed aspect.

FIG. 2 illustrates a methodology of granting access to a disparate domain in accordance with the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

In one aspect of the invention, at 202 an owner is deemed of a domain. It will be appreciated that a security context can be established between disparate domains whereby an owner of a domain establishes authorization to access a disparate domain(s). At 204, a call is received to access a disparate domain. Accordingly, at 206, a determination can be made if the owner of the first domain possesses adequate permissions to access the disparate domain. If it is determined that adequate permissions are not in place, access is denied at 208 and a stop block is reached. On the other hand, if at 206 it is determined that adequate permissions are in place, access to the disparate domains and the resources therein can be granted at 210.

The subject invention can support security execution contexts of principals other than a caller. For example, database management systems (DBMSs) (e.g., SQL Server 2005-brand DBMSs) can support or can be enhanced to support these security execution contexts. Although the aspects described herein are directed to an SQL Server-brand DBMS, it is to be appreciated that the novel functionality of the execution contexts described herein can be applied to any DBMS in any manner without departing from the sprit and scope of the invention and claims appended hereto. For example, the functionality of an "execute as" statement described herein can be effected in any manner upon any DBMS or multi-domain system without departing from the novel aspect of the invention. The "execute as" terminology is to be considered as one aspect of the invention and not to limit the invention in any way. In other words, the functionality of the "execute as" statement described herein can be effected in countless statements.

In accordance with a TSQL-brand (Transact SQL-brand) programming language, the programming language can be augmented with the following statement for the purpose of providing security execution contexts:

```
EXECUTE as {login | user} = <principal_name>
REVERT
```

In addition, the TSQL-brand programming language statements that result in creation of executable code can be augmented to specify a security execution context under which the code is slated to execute. For example:

```
CREATE PROC [ EDURE ] [owner_name.] procedure-name [ ; number
]
    [ { @parameter data_type }
        [ VARYING ] [ = default ] [ OUTPUT ]
    ] [ ,...n ]
[ WITH < procedure_option > { ,...n } ]
[ FOR REPLICATION]
AS { <sql_statement > { ,... } | < .NET_Framework_reference > }
ALTER PROC [ EDURE ] [owner_name.] procedure-name [ ; number ]
    [ { @parameter data_type }
        [ VARYING ] [ = default ] [ OUTPUT ]
    ] [ ,...n ]
[ WITH < procedure_option > { ,...n } ]
[ FOR REPLICATION]
AS { <sql_statement > { ,... } | < .NET_Framework_reference > }
<procedure_option > ::=
[ ENCRYPTION ]
[ RECOMPILE ]
[ EXECUTE AS { CALLER | OWNER | SELF | 'user_name' ]
< .NET_Framework_reference > ::=
EXTERNAL NAME [ assembly_schema. ]
assembly_name:class_name[::method_name]
< sql_statement > ::=
{ [ BEGIN ] statements [ END ] }
```

Figure 3:
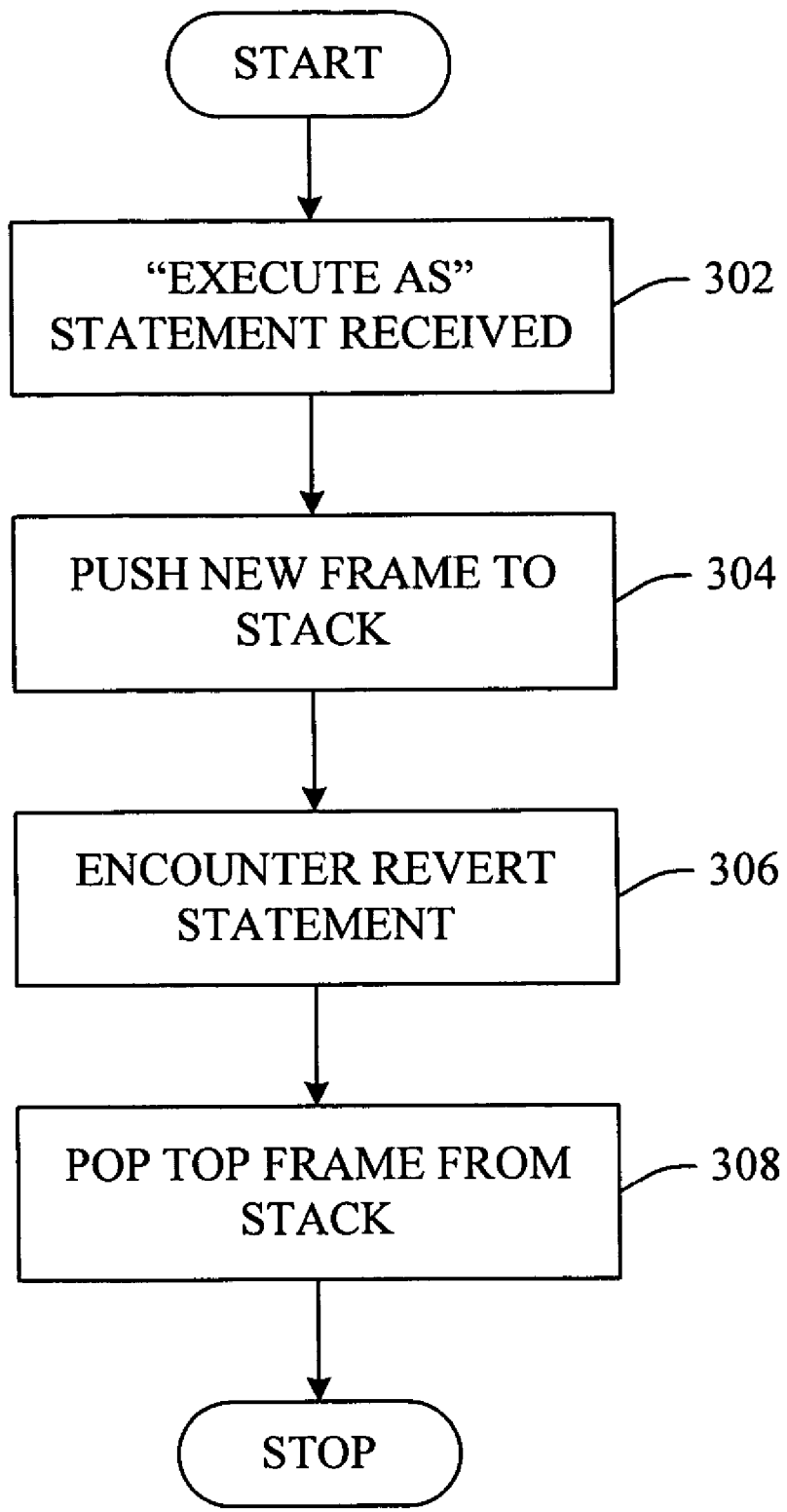
FIG. 3 illustrates an exemplary flow chart of procedures of receiving an "execute as" statement in accordance with a disclosed aspect.

Turning now to FIG. 3, a methodology of effecting the execution context is shown. Accordingly, to achieve this flexibility and security in the execution context, the DBMS (e.g., SQL Server) can maintain a stack of execution contexts. At 302, an "execute as" statement as described supra can be received. When the "execute as" statement is executed, a new frame denoting the new security context can be pushed into the stack at 304. Following, a revert statement can be encountered at 306. When the "revert" statement is encountered at 306, the top most frame can be popped at 308. In other words, when the "revert" statement is encountered at 306, the top most frame can be removed from the top of the stack at 308.

Figure 4:
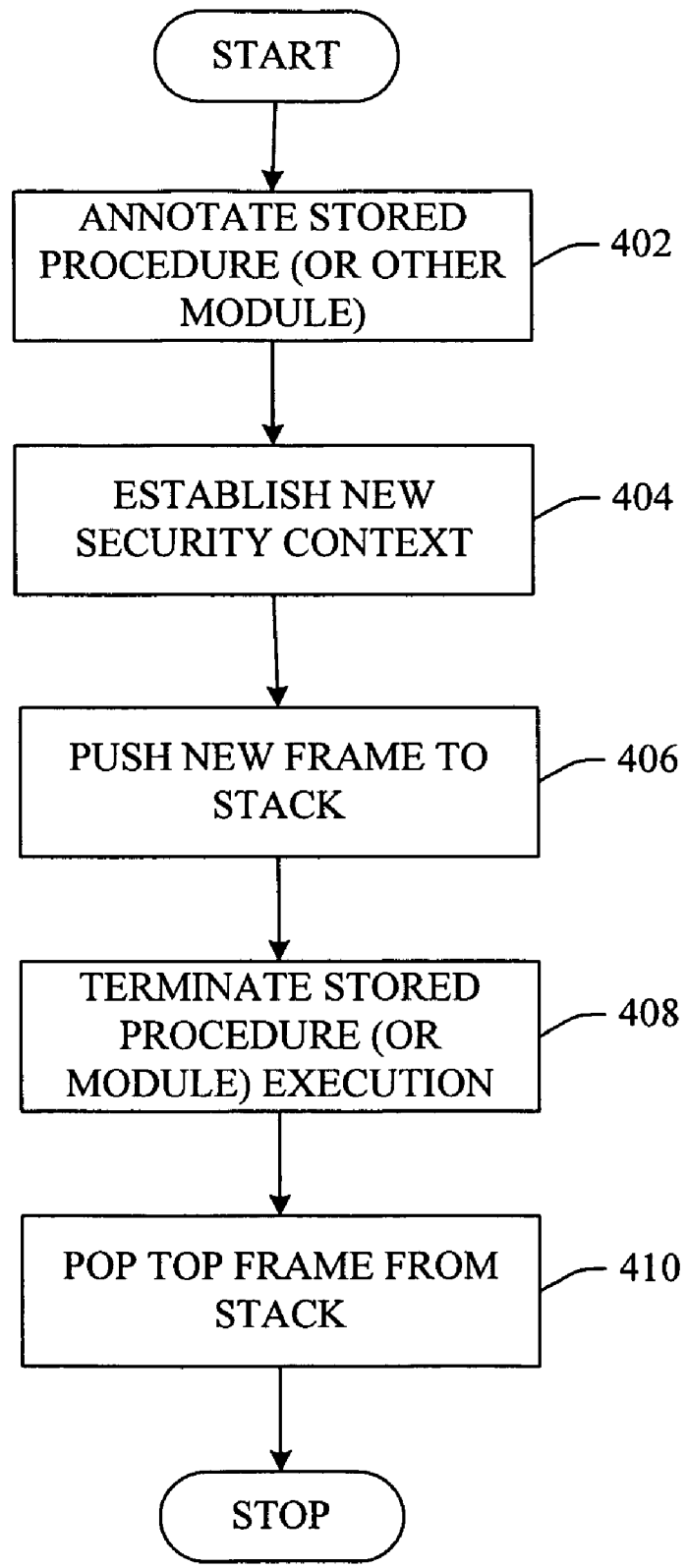
FIG. 4 illustrates an exemplary flow chart of procedures to annotate a stored procedure in accordance with a disclosed aspect.

FIG. 4 illustrates another aspect of the invention that is directed to the establishment of security contexts in accordance with the execution of stored procedures (or other modules). At 402, a stored procedure (or other module) can be annotated by an "execute as" clause. At 404, a new security context can be established. The new security frame can be pushed to the stack at 406. The execution of the stored procedure (or other module) can be terminated at 408. Therefore, at 410, the pushed frame can be popped when the stored procedure (or other module) execution terminates.

Thus, as illustrated by the methodologies of FIGS. 2 through 4, the invention can enable a number of distinct scenarios. First, the invention can enable an owner of the procedure to allow the stored procedure to be executed at a different (e.g., higher or lower) security level. Additionally, in accordance with the invention, the owner can control who can execute the stored procedure via a normal execute permission on the stored procedure. In essence, such a single procedure can form the basis of a trusted sub-system. It will be appreciated that a novel feature of the invention is that, since the procedure is executing with different (e.g., typically higher)

privileges, accesses to resources made inside the procedure may not need to be checked against the caller of the procedure.

With respect to the security mechanism of FIG. 4, the owner of a stored procedure (or other module) can ensure that the caller cannot directly access or perform operations on the resources outside of the stored procedure. Thus, in accordance with an aspect, the caller can be constrained to exactly an intended action or business logic specified in the stored procedure. Access beyond the scope of the called stored procedure can be prohibited thru the normal access control mechanisms available.

Once the new security context is established on entry to the stored procedure, any other procedure that the stored procedure calls will be executed under the newly impersonated context. The stand-alone TSQL-brand statements can behave identically, except in that the context is reverted when the "revert" statement is encountered.

It is to be appreciated that disparate trusted sub-systems can be layered using nested procedure sets resulting in the ability to build arbitrarily complex nested applications. Given such an ability, a malicious administrator of a database can figure out from out-of-band sources of information (e.g., social circles) about the existence of a privileged user in another database. Therefore, the malicious administrator may be able to create a procedure in his own database to execute as that individual and hence be able to perform actions or retrieve data in the target database without explicit permission.

To address this scenario, each pushed frame can keep a note of a special principal called the "authenticator." The "authenticator" connotes who vouches for the security context. This is different from the principal of the security context of the previous frame and is described below.

Figure 5:
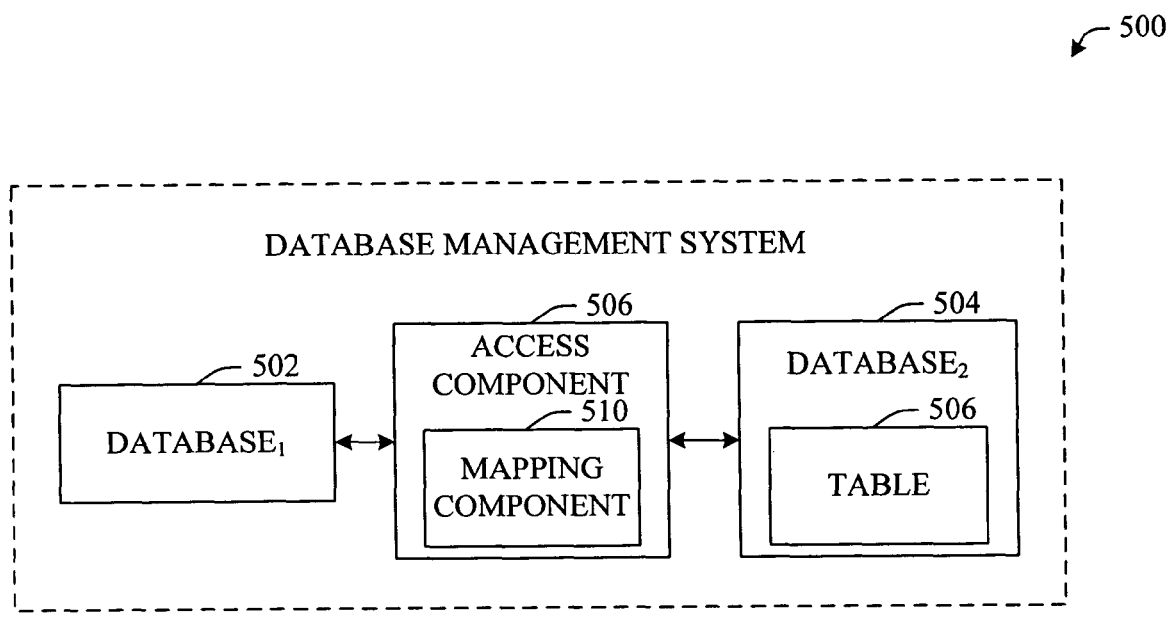
FIG. 5 illustrates a general component block diagram of a system having a mapping component in accordance with an aspect of the subject invention.

Referring now to FIG. 5, a DBMS 500 is shown. Generally, DBMS 500 can include a first database, DATABASE$_1$ 502 and a second database, DATABASE$_2$ 504. An access component 506 can be provided to effect trusted access between the databases (502, 504). As illustrated, DATABASE$_2$ 504 can include a table 508. Accordingly, the access component 506 can be provided to regulate or control authorized access to the table 508 (and other resources) within DATABASE$_2$ 504.

Continuing with the example, when the security context navigates to a database (e.g., DATABASE$_2$ 504), mapping component 510 can map the security context to an identity provisioned in the database 504. Before the system performs that mapping, the credentials of the authenticator can be checked to determine whether it has permissions to vouch for the mapping in that database (e.g., 504).

The owner of the target database, e.g., DATABASE$_2$ 504 of the example, can bestow an authenticator principal such a privilege via a special permission called "authenticate." It will be appreciated that the owner of the source database, e.g., DATABASE$_1$ 502 of the example, is an authenticator.

Figure 6:
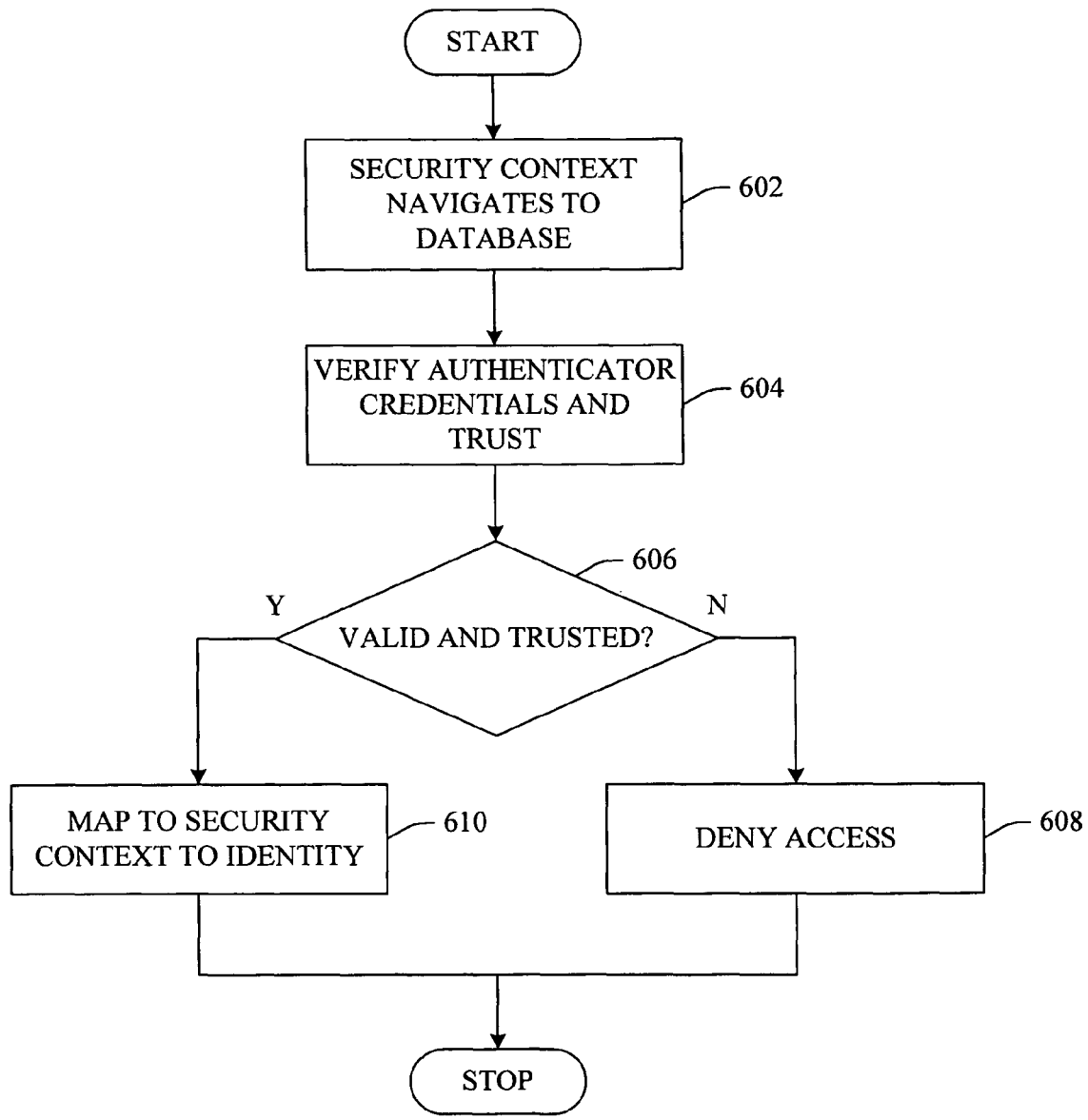
FIG. 6 illustrates an exemplary flow chart of procedures to verify authenticator credentials in accordance with a disclosed aspect.

FIG. 6 illustrates an exemplary methodology of validating credentials. At 602, the security context navigates to the database. The credentials of the authenticator can be verified at 604. At 606, a determination is made if the credentials are valid and the authenticator is trusted. If the credentials are found not to be valid or the authenticator is not trusted at 606, access to resources is denied and a stop block is reached. On the other hand, if the credentials are found to be valid and the authenticator is trusted at 606, the system can map the security context to an identity provisioned in the database.

Another aspect of the invention is directed to a DBMS (e.g., SQL Server-brand DBMS) that supports the notion of signing. In this aspect, at the top-most layer is a DBMS (e.g., SQL Server-brand) instance. An administrator of the instance can have carte-blanche rights to the entire server and all databases that are available in the instance.

At the lower layer, each database (e.g., 502, 504) can have a model of authorization of its own. Each database can be owned by a principal that is the root of the authorization tree for the respective database and can delegate rights for administration or other activities to other principals provisioned in that database. Ideally, the owner of any database or any of its delegates in that database should not be able to access data in any other database that is owned by a different principal.

In operation, when a principal logs into a DBMS instance, the system can check for authentication and if deemed valid, can establish an identity for the principal in the DBMS instance. When that principal enters a database within the instance to access data or to execute code, the identity of the principal that was established at the server level can be re-mapped to the database in accordance with a global identity of the principal.

As described supra, the subject invention introduces a novel notion of "execute-as" whereby a database administrator can mark a stored procedure or a piece of code that resides in a database to "execute as" another principal that is not the invoker/executor of the stored procedure. This novel feature supports a trusted sub-system model of execution whereby individual data resources need not be given access to clients. Rather, the piece of code (e.g., stored procedure) could be trusted to perform the permission checks and then to elevate to a more privileged execution context.

To recall from the scenarios described supra, there may be no security threat if the code was executed in the context of the caller. Rather, a threat could exist because of the fact that the code is executed in the context of another principal.

To define a model of sharing, therefore, it can be important to formalize a notion of who authenticated the security context. This is one novel feature of the subject invention. Generally, as described above, the following are the two main aspects of the model. First, the target database can define the principals that are allowed to establish the identity of a security context. Secondly, the implementation of the database system necessarily tags along with every security context, the principal that established the security context. If that principal is not permitted to establish the security context in the target database, the call fails.

In order to rationalize the behavior of executing as the caller, it should be appreciated that the system-administrator, which establishes the context when the principal logs into the system, is universally trusted by all participating databases.

As described earlier, it is to be understood and appreciated that this can be modeled as a special database level permission called "authenticate." The target database owner can create a user from the universal identity of the user and can grant this special permission thru the normal TSQL statement:

[Grant|Deny|Revoke] Authenticate to User

In essence, the model for trust can be enunciated in short as the owner of the source database can be trusted to the target database to be able to establish security contexts there.

In operation, as described supra, an added feature of "execute as" can be employed whereby a stored procedure can be modeled as "execute as." At that time, the user that the stored procedure is asked to "execute as" is not the user the system has authenticated to be. This aspect will be better understood upon a review of FIG. 7 that follows.

Figure 7:
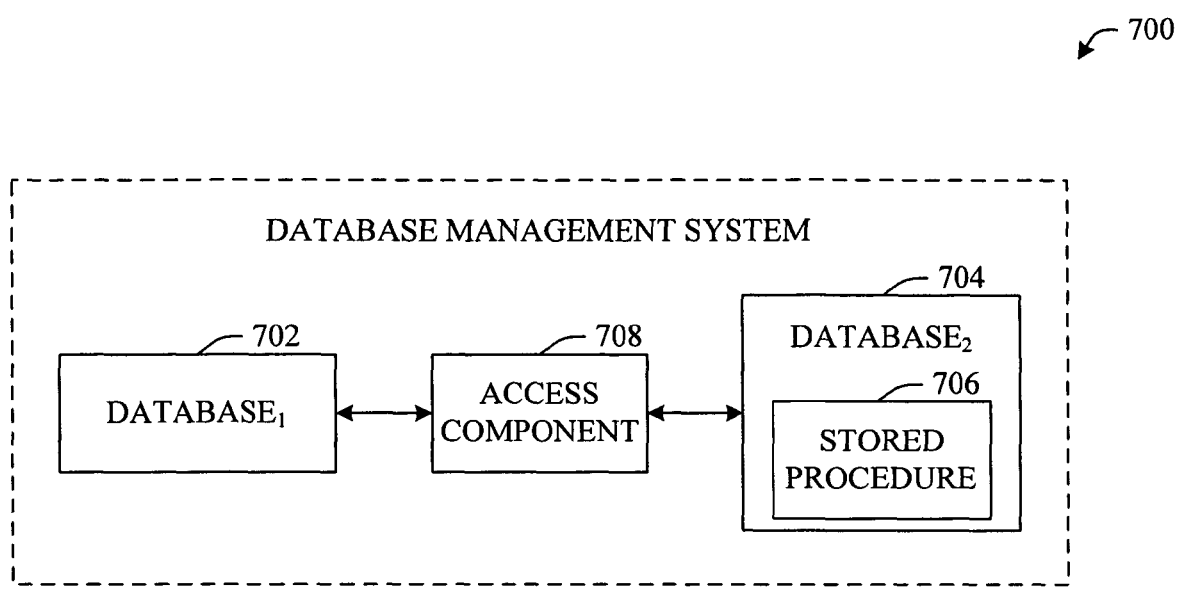
FIG. 7 illustrates a general component block diagram of a system that grants access to a stored procedure in a disparate database in accordance with an aspect of the invention.

FIG. 7 illustrates a database management system (DBMS) 700 in accordance with an aspect of the invention. DBMS 700 of FIG. 7 can include two disparate databases 702, 704. As illustrated, suppose there are two databases, DATABASE$_1$ 702 and DATABASE$_2$ 704. Accordingly, the two disparate databases (702, 704) can have two disparate owners, e.g., DBO1 and DBO2 respectively. It is to be appreciated that other aspects can exist and can include any number of disparate databases without departing from the functionality of the invention disclosed and claimed herein.

Continuing with the example, assume that that DBO1 has brought in a stored procedure 706 into the database 702 marked as "execute as" DBO2. When that stored procedure 706 executes, it communicates with DATABASE$_2$ 704 via access component 708 and validates the identity of DBO2. In accordance with the model of operation between the databases (702, 704) illustrated in FIG. 7, DBO2 can be assured that under a particular action (e.g., calling of stored procedure 706), DBO1 will not be able to spoof and access data within DATABASE$_2$ 704.

Following is a description of how DBO2 can actually make the database (e.g., DATABASE$_2$ 704) immune from this kind of attack from DBO1. Effectively, DBO2 can trust DBO1 to establish a context in the database (e.g., DATABASE$_2$ 704). Therefore, because a trust relationship exists, DBO2 can assume that what DBO1 wants is correct and that the security context DBO1 tries to establish within DBO2 is trustworthy. As a result, DBO2 can effectively grant a level of trust to DBO1 to act as anybody in the database (e.g., DATABASE$_2$ 704). If the trust was not established, the call would fail, protecting DBO2.

In another aspect of the invention where the owner of DATABASE$_1$ 702 is the system administrator. Frequently, database applications have a situation where the owner of a database is the system administrator. In that case, DBO2 unconditionally trusts DBO1. It will be appreciated that this situation can be viewed as the nature of the authorization model because everyone trusts the owner of the code.

Figure 8:
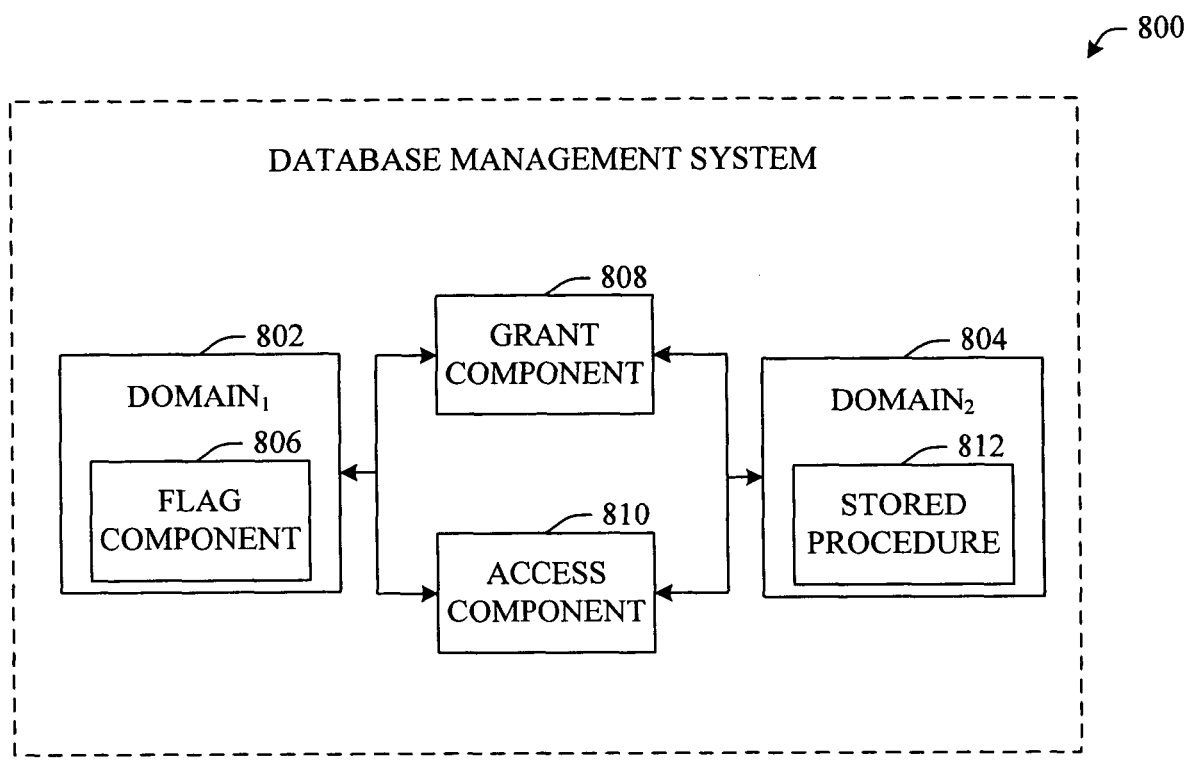
FIG. 8 illustrates a general component block diagram of a system that employs a flag to establish access between disparate databases in accordance with an aspect of the subject invention.

Referring now to FIG. 8, a system 800 is shown. System 800 facilitates establishing a trust relationship between domain owners. More particularly, the system 800 includes DOMAIN$_1$ 802 and DOMAIN$_2$ 804. As described with reference to the aspects described previously, the domains 802, 804 can be disparate database instances.

Trustworthiness can be achieved by employing a flag on to the database. As illustrated, flag component 806 can be applied to DOMAIN$_1$ 802 via the grant component 808. Essentially, the flag component 806 can be specified via the grant component 808 using an alter database statement. In one aspect, the name of the flag can be called "trustworthy."

In accordance with the aspect, there are two acts that occur in order to deem the owner of DOMAIN$_1$ 802 as "trustworthy." First, the owner of DOMAIN$_2$ 804 must trust the owner of DOMAIN$_1$ 802. Secondly, the owner of DOMAIN$_1$ 802 marks the domain (e.g., database) as "trustworthy" as related to a particular code (e.g., stored procedure 812) that will be executed in DOMAIN$_1$ 802 to actually materialized in DOMAIN$_2$ 804. As described above, DOMAIN$_1$ 802 can employ flag component 806 to effect marking as "trustworthy."

Figure 9:
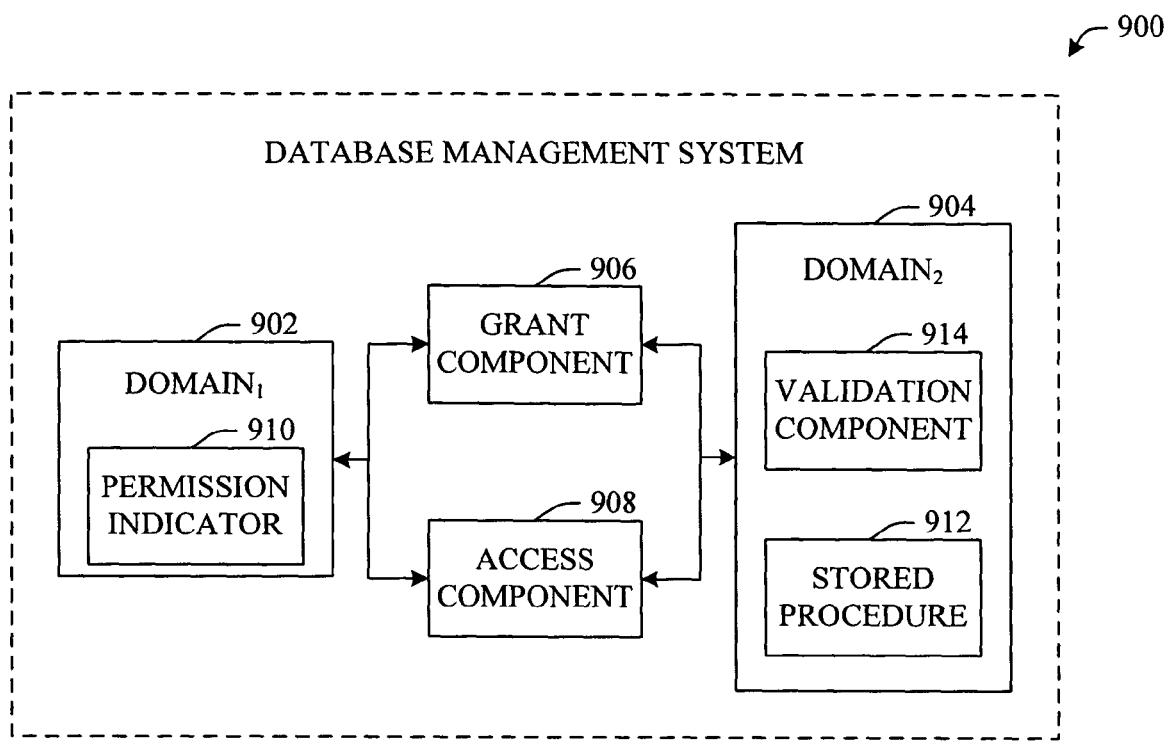
FIG. 9 illustrates a general component block diagram of a system that employs a permission indicator and validation component in accordance with an aspect of the subject invention.

It will be appreciated that any method of indicating trust can be employed in alternate aspects. For example, with reference to FIG. 9, a system 900 is shown. Generally, the system 900 can include a first domain, DOMAIN$_1$ 902, a second domain, DOMAIN$_2$ 904, a grant component 906 and an access component 908. It will be appreciated that these components will have the same or similar functionality as the components with like names described above.

System 900, and specifically DOMAIN$_1$ 902, additionally employs a permission indicator 910 that can make other domains (e.g., DOMAIN$_2$ 904) aware of trustworthiness. DOMAIN$_2$ 904 can include a stored procedure 912 and validation component 914. The validation component 914 can be employed to authenticate (e.g., validate) the permission indicator 910 thus permitting access to resources (e.g., stored procedure 912) within DOMAIN$_2$ 904.

Thus far, this disclosure has been primarily directed to establishing a level of trust between domains. In an alternate aspect, certificate mechanisms and authentication (e.g., public/private keying) can be employed to protect a target domain from unauthorized access by a source domain.

Figure 10:
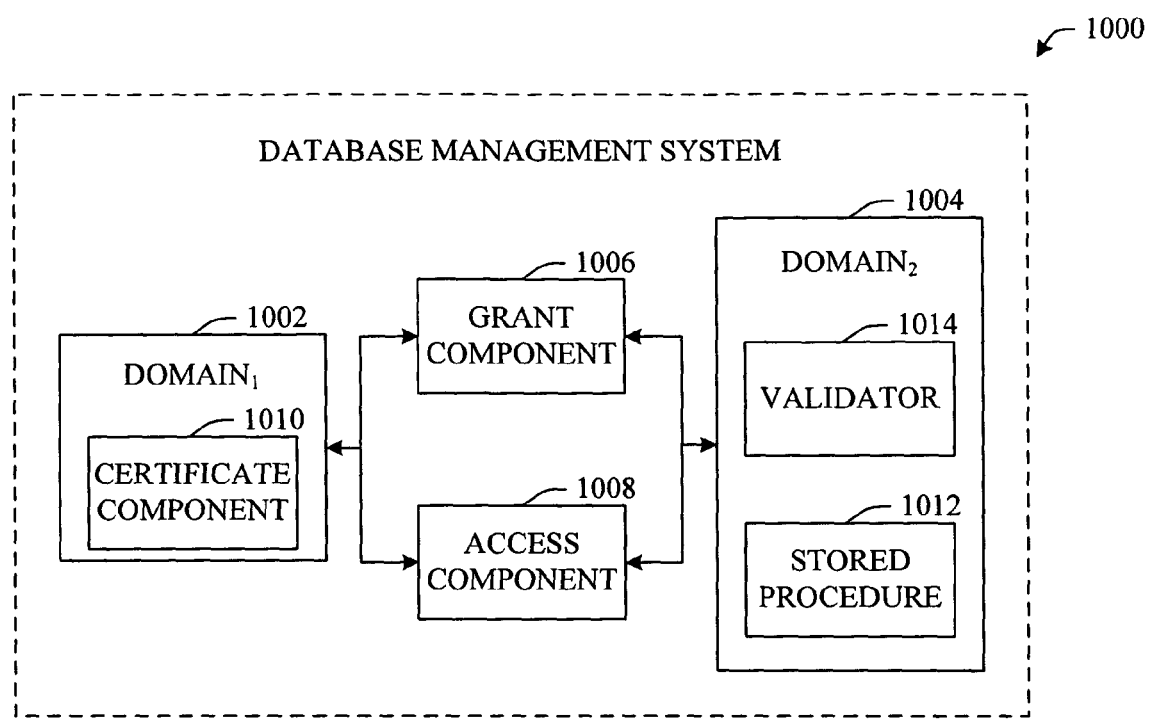
FIG. 10 illustrates a general component block diagram of a system that employs a certificate and validation component in accordance with an aspect of the subject invention.

Turning now to FIG. 10, a system 1000 having a first domain, DOMAIN$_1$ 1002, a second domain, DOMAIN$_2$ 1004, a grant component 1006 and an access component 1008 is illustrated. As trust was established in the previously described aspects, within the same specific instance, DOMAIN$_2$ 1004 can determine that it trusts a certificate 1010. Therefore, DOMAIN$_1$ 1002 can digitally sign the stored procedure 1012 by the trusted certificate 1010. It is to be appreciated that, in the certificate aspect of FIG. 10, it may not be necessary for DOMAIN$_1$ 1002 to mark the database as "trustworthy." This is true because, in the trust certificate aspect, DOMAIN1 1002 has the option to sign or not to sign the stored procedure. Accordingly, validation component 1014 can discern if trust should be determined based at least in part upon the presence of an adequate certificate component 1010. It is to be appreciated that this trusted certificate aspect can be employed in conjunction with the trust examples described above. In this way, should an error occur with regard to the signed certificate, trust could be maintained as established at the domain level.

In operation, the trust certificate aspect of FIG. 10 is similar to the trust aspects directed to granting trust to a user. However, rather than granting trust to a user or granting authenticate to the owner of DOMAIN$_1$ 1002, DOMAIN$_2$ 1004 can grant authenticate to a code certificate component 1010 (e.g., via public private key for digital signatures).

As described herein, the subject invention has been described with reference to three scenarios. The first is directed to a trust model. More particularly, the first model is directed to how trust can be articulated between disparate domains in an instance. The second and third scenarios are directed to implementing (e.g., realizing) trust between disparate domains in the instance. One implementation scenario is directed to granting permissions to an owner for domain access and a second to signing a resource (e.g., code). In all cases, each model described herein is one of authorizations across sub-domains.

In summary, with respect to implementing a trust model, suppose there are two resources (DB1 and DB2). The first model is that DB2 can trusts the owner of DB1 (DBO). In accordance with this scenario, anything that comes out of the database that is owned by DBO and marked as "trustworthy" can be trusted by DB2. For example, stored procedures and calls generated from DB1 can access information within DB2 because they contain permissions.

The second model of implementation is directed to trusting certificates. This scenario does not blindly trust a domain owner (e.g., DBO). Rather, a certificate can be a basis of trust. Therefore, any piece of code (e.g., stored procedure), if signed by an appropriate certificate, the code will be trusted upon an attempt to access a resource within DB2. In other words, because DB2 deems the certificate trustworthy, trust can be established between that piece of code and a target using the certificate as the basis of trust. In operation, the certificate will play the role of the authenticator when that piece of code is called, therefore, that piece of code can be trusted.

It is to be appreciated that, in addition to establishing trust between two databases, these models can be employed to establish trust between a database and a server instance. For example, the models can be employed with reference to a server event whereby configurations can be changed within the server that affect and apply to all databases within the server.

Figure 11:
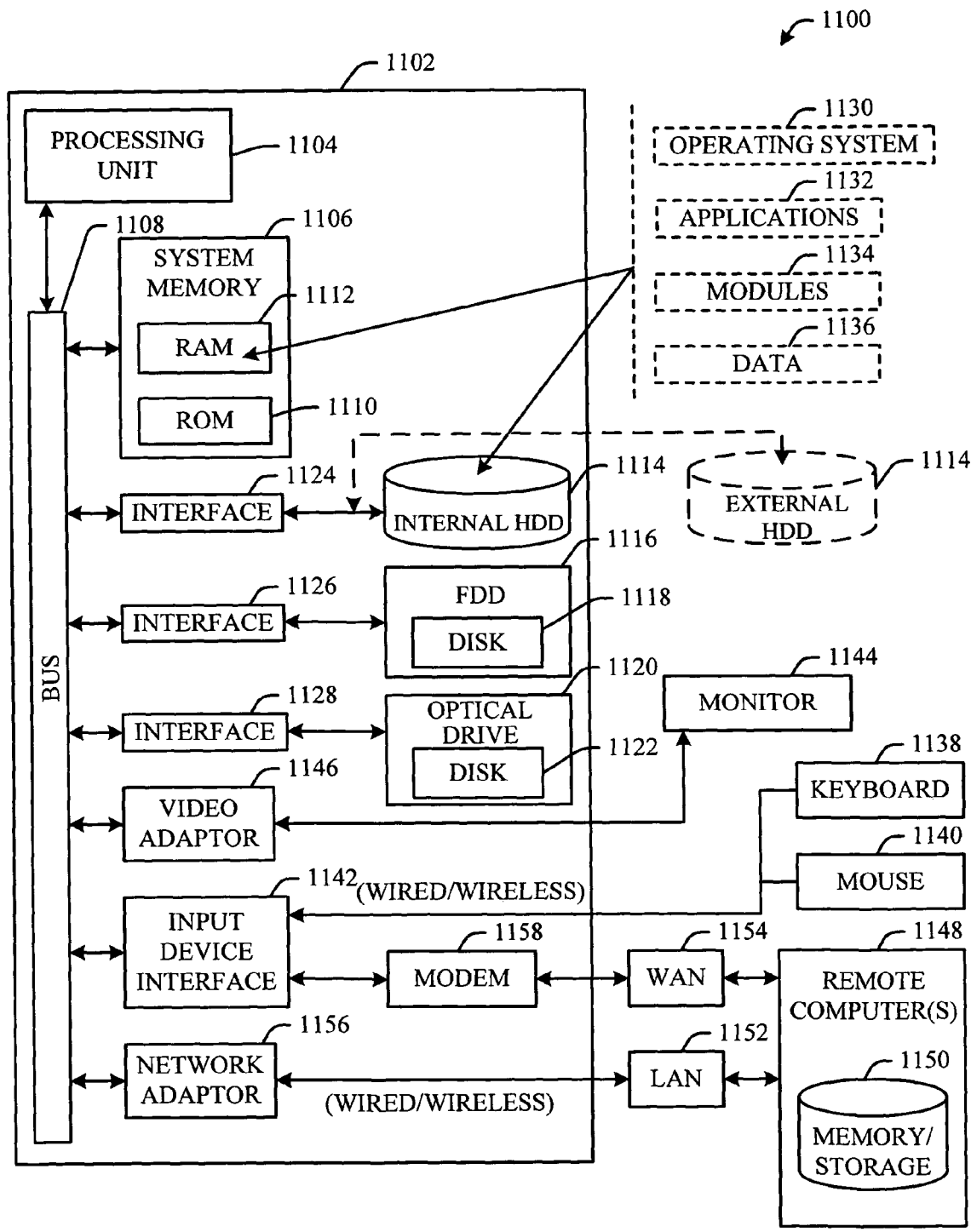
FIG. 11 illustrates a block diagram of a computer operable to execute the disclosed architecture.

Referring now to FIG. 11, there is illustrated a block diagram of a computer operable to execute the disclosed architecture. In order to provide additional context for various aspects of the subject invention, FIG. 11 and the following discussion are intended to provide a brief, general description of a suitable computing environment 1100 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media.

Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the exemplary environment 1100 for implementing various aspects of the invention includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the invention can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
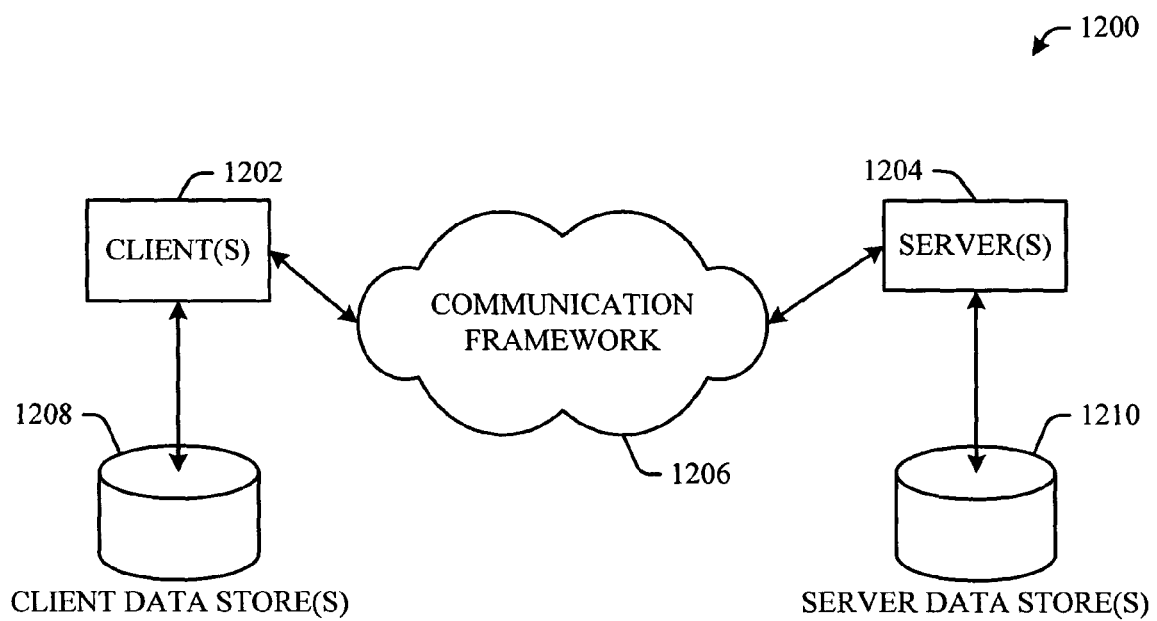
FIG. 12 illustrates a schematic block diagram of an exemplary computing environment in accordance with the subject invention.

Referring now to FIG. 12, there is illustrated a schematic block diagram of an exemplary computing environment 1200 in accordance with the subject invention. The system 1200 includes one or more client(s) 1202. The client(s) 1202 can be hardware and/or software (e.g., threads, processes, computing devices). The client(s) 1202 can house cookie(s) and/or associated contextual information by employing the invention, for example.

The system 1200 also includes one or more server(s) 1204. The server(s) 1204 can also be hardware and/or software (e.g., threads, processes, computing devices). The servers 1204 can house threads to perform transformations by employing the invention, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that provides a secure context within a multi-domain database management system, comprising:
at least one processor coupled to memory that executes:
a caller's stored procedure to access at least one resource contained in a disparate domain, wherein the stored procedure is annotated with an execute as clause to impersonate a principal of the disparate domain other than the caller of the stored procedure, wherein the execute as clause identifies the impersonated principal, and that when the execute as clause is executed, a security context for the impersonated principle is implemented by pushing the security context for the impersonated principle into a stack of execution contexts and popping the security context from the stack of execution contexts when the stored procedure terminates irrespective of the principal actually calling the stored procedure, enabling the caller to operate in a security context different from that of the caller;

an access component that validates an identity of the impersonated principal in the disparate domain and controls access to the resources of the disparate domain based at least in part on the privileges of an authenticator, wherein the authenticator's privileges are assigned by an administrator of the disparate domain; and a mapping component that maps a security context to an identity provisioned in the disparate domain if the authenticator's credentials are determined to be trusted.

2. The system of claim 1, the authenticator's privileges are trusted if they include an authenticate permission that allows the authenticator to guarantee the mapping in the disparate domain.

3. The system of claim 1, the authenticator is at least one of an owner or administrator of a domain.

4. The system of claim 1, the administrator of the disparate domain is the owner of the disparate domain.

5. The system of claim 1, the disparate domain is included within a same instance of a server.

6. The system of claim 1, further comprising a grant component that determines the privileges of the authenticator.

7. The system of claim 1, wherein the domains are databases.

8. The system of claim 1, wherein the resource is a database.

9. The system of claim 1, wherein the privileges of the authenticator are determined based on at least one of being flagged as trustworthy, wherein the authenticator has the authenticate permission if the authenticator's database is flagged trustworthy, having a certificate that indicates trustworthiness, or an owner of a domain is also the system administrator, wherein the disparate domain unconditionally trust the system administrator.

10. A method for providing secure interaction between databases, comprising:

employing a processor executing computer executable instructions stored on a computer readable storage medium to implement the following acts:

determining at least one of a first database or an owner of the first database is trusted to access at least one resource in a second database;

providing a caller context established within the first database with a mapping context to access the resource in the second database;

invoking from a first identity associated with the owner of the first database, a stored procedure in the first database to access the resource in the second database, and executing the stored procedure using a second identity residing in the second database that is the not the first identity of the invoker of the stored procedure, but whereafter the stored procedure is executed using the second identity in a security context for the second identity by pushing the security context for the second identity into a stack of execution contexts and popping the security context from the stack of execution contexts when the stored procedure terminates irrespective of the identity actually calling the stored procedure, enabling the first identity to operate in a security context different from that of the first identity;

validating an identity of the impersonated principal in the disparate domain and controls access to the resources of the disparate domain based at least in part on the privileges of an authenticator, wherein the authenticator's privileges are assigned by an administrator of the disparate domain; and mapping a security context to an identity provisioned in the disparate domain if the authenticator's credentials are determined to be trusted.

11. The method of claim 10, further comprising executing instructions in the first database to at least one of: read, write or manipulate data in the second database.

12. The method of claim 10, wherein the first database and second database are disparate databases within the same instance of a server.

13. The method of claim 10, further comprising flagging the first database as trustworthy.

14. The method of claim 10, wherein the first database is trusted to access at least one resource in a second database if the first database is at least one of flagged as trustworthy, provides a trusted certificate, or the owner of the first database is the system administrator.

15. A computer implemented system that implements authentication between domains, comprising:

at least one processor coupled to memory that retains instructions for:

a context of execution for an owner of a first domain, the context specifies a set of privileges for the owner of the first domain within a second domain;

a stored procedure in the first domain that attempts to access resources in the second domain, wherein the stored procedure executes as a first principal maintained in the second domain who is not the caller of the stored procedure;

an access component that validates the identity and privileges of the first principal under which the stored procedure is attempting to execute in the second domain;

a grant component that conveys a statement expressed in a declarative language that indicates at least one of the owner of the first domain is trusted to access the second domain, or a certificate is trusted in a manner that contexts established within a signed code that corresponds to the certificate facilitates access to the second domain, and that pushes a security context for the first principle onto a stack of execution contexts at the second domain, allowing the procedure in the first domain to execute in the second domain so long as the security context is in the stack, and pops the security context from the stack when the stored procedure terminates; and an identity component that marks the first domain as trustworthy to the second domain, the grant component provides at least one of a calling context that is established and authenticated by the owner of the first domain with access to the second domain when the owner of the first domain is declared trusted by the second domain or a calling context that is established within the signed code that facilitates access to the second domain when the certificate is trusted by the owner of the second domain.

16. The system of claim 15, the first domain and the second domain execute within a same instance of a server.

17. The system of claim 15, an owner of the second domain grants the owner of the first domain a permission to establish contexts that are trusted within the second domain through a grant statement.

18. The system of claim 15, the second domain inherently trusts calls vouched for by the system administrator of the first domain.

* * * * *